UNITED STATES PATENT OFFICE.

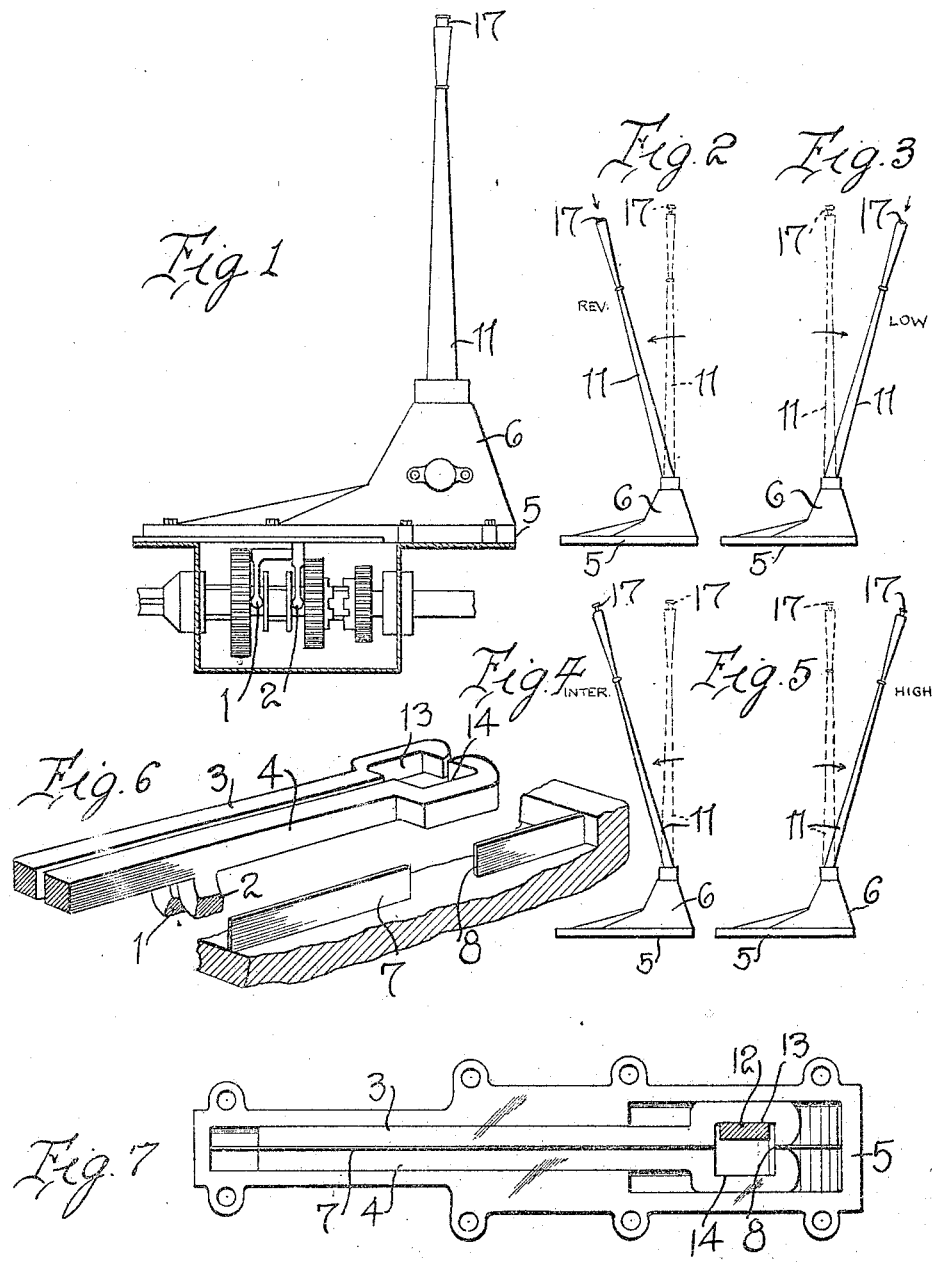

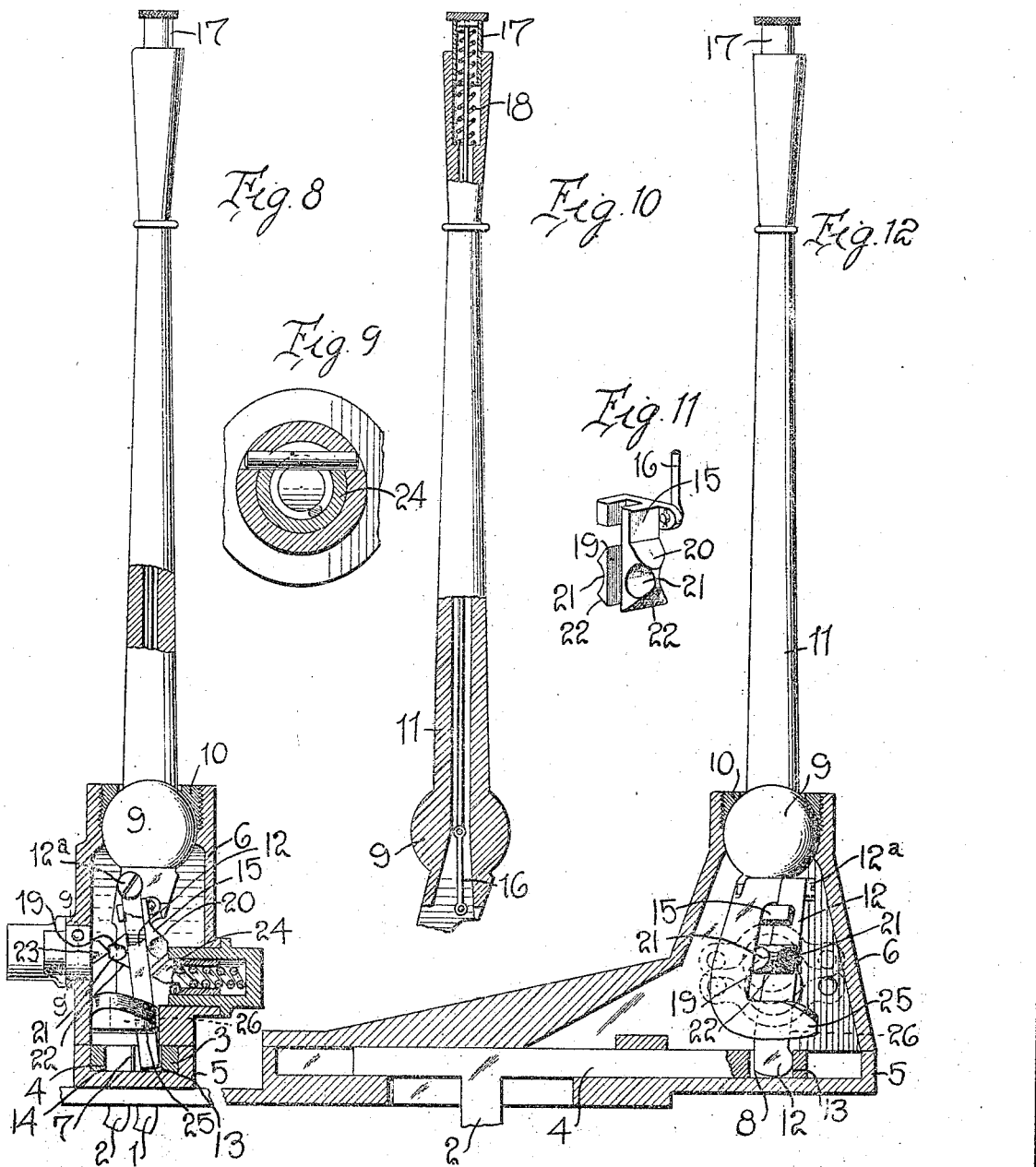

PERCY F. RICE, OF TUSTIN, CALIFORNIA.

GEAR-SHIFT CONTROL.

1,175,473.  Specification of Letters Patent.  Patented Mar. 14, 1916.

Application filed August 5, 1915. Serial No. 43,718.

*To all whom it may concern:*

Be it known that I, PERCY F. RICE, of Tustin, in the county of Orange and State of California, have invented certain new and useful Improvements in Gear-Shift Control; and I do hereby declare the following to be a full, clear, and exact description of the invention, such as will enable others skilled in the art to which it appertains to make and use the same.

My invention consists in the novel features hereinafter described, reference being had to the accompanying drawings, which show one embodiment of my invention which I have selected for the purpose of illustration, and the said invention is fully disclosed in the following description and claims.

Referring to the said drawings: Figure 1 is a side view of my transmission-operating lever, showing as much of the transmission mechanism as is necessary for a proper understanding of my invention; Fig. 2 is a diagrammatic view of my operating lever, showing the same in reversing position; Fig. 3 is a similar view, showing the same in low-speed position; Fig. 4 is a similar view, showing the same in intermediate position; Fig. 5 is a similar view, showing the same in high-speed position; Fig. 6 is a perspective view of the shifting rods, their division plate, and the gate; Fig. 7 is a horizontal sectional view showing the shifting rods assembled in their casing, and the division plate in its position relative to the same; Fig. 8 is a vertical sectional view of the shifting rod casing and the selector rod operating mechanism; Fig. 9 is an enlarged vertical sectional view taken on line 9—9 of Fig. 8; Fig. 10 is a view of the operating lever, partly in section; Fig. 11 is a perspective view of the selective lever operating cam; Fig. 12 is a longitudinal vertical sectional view of my complete device.

My invention relates to change speed gearing for power transmission, primarily intended for use in connection with motor vehicles, and the like, although utilizable for other purposes, and particularly to the provision of change speed gearing having three or more speeds which are brought into operation by the movement of the operating lever in opposite directions from a neutral position, the movement of such op-
erating lever being in a single plane, and wherein the movement of the lever from a forward to a rearward position corresponding to one set of gears will shift said transmission mechanism, for example, from either the low speed position to the reverse, or from high speed position to intermediate speed position, depending upon the actuation of selecting mechanism which selecting mechanism preferably automatically returns to its normal position upon the operating lever being brought to neutral position, unless said selective mechanism be actually held against such automatic operation.

One object of the invention is to simplify the changing of the speed gearing and to provide such a construction and interrelation of elements as to require a minimum of attention and acts on the part of the driver to make any desired change of gears.

Another object of the invention is to provide such a construction and interrelation of elements that when the controlling lever is moved to its neutral position the interrelated elements are automatically returned to a normal operative relation ready for actuation, by the mere movement of the controlling lever, to throw into mesh either one of two gears.

Another object is to provide a change speed gearing in which after the interrelated parts have been actuated to throw into mesh one of a given set of gears, and while such gear is in mesh, without any movement of the controlling lever the selecting mechanism may be simply, easily and efficiently set so that by merely bringing the controlling lever to neutral position to bring such selective mechanism into operation, then by the mere movement of the controlling lever in either direction from its neutral position either one of another set of gears may be thrown into mesh; also to provide the further feature of the automatic return of such selecting mechanism to its first or normal position upon the further return of the controlling lever to neutral position.

An object of the invention is to provide improved mechanism for controlling and effecting the change of speed gearing for power transmission and in the preferred embodiment of my invention I combine with shifting rods (which carry arms through the medium of which several sets of gears in the change box are moved, and which are preferably provided with slots for the engagement of a selective lever for moving the shifting rods,) a selective lever or device which is operatively connected to and operated by the change speed lever but which is independent of such change speed lever in so far that it is capable of a movement in a lateral direction from the slot in one selector bar to a slot in an adjacent bar without any lateral movement of the change speed lever. Preferably this selective device or lever, when the change speed lever is in neutral position, is in operative connection with one of said shifting rods and is automatically returned to such operative connection therewith when the change speed lever reaches neutral position in its movement, unless the selective device is manually held against such automatic operation. Preferably this automatic lateral movement of the selective lever is effected by providing a sliding cam on the selective device or lever and providing spring-pressed plungers on the sides of the shifting rod casing adapted to operate on said sliding cam.

In the drawings, 1 and 2 indicate the arms, through the medium of which the several sets of gears in the transmission casing are operated in the well-known manner. These arms 1 and 2 are integral with the shifting rods 3 and 4, which are mounted to slide in a casing 5 having a suitable top 6; and a division plate 7 is provided between said shifting rods and has a cut-away or gate portion 8.

Mounted in the upper end of the casing top 6 by a ball-and-socket joint 9, which is maintained in the casing by means of a nut 10, is a hollow operating lever 11 near the lower end of which is pivotally mounted a selective lever 12, which engages the slots 13 and 14 in the shifting rods 3 and 4, and moves said rods either forward or backward, depending on the direction in which the operating lever 11 is forced.

From an examination of the drawings, it will be seen that the selective lever 12 is pivoted at 12ª to the operating lever for lateral movement independent of said operating lever, so that the lower end of said selective lever may be shifted laterally through the gate 8 in order to engage either the shifting rod 3 or the selector rod 4, and the mechanism for accomplishing this result comprises a vertical sliding member 15, which is mounted on the selective lever, and is controlled by means of a rod 16, which passes up through the operating lever, and is provided at its upper end with an operating button 17 under the control of a spring 18, which is mounted in a recess in the upper end of the operating lever. This sliding member 15 is provided with laterally extending noses 19 and 20, the nose 19 having cam portions 21 on its forward and rear side, and the cam portion 22 on its under side, the nose 20 being provided with similar cam portions which extend in the opposite direction from that of the other nose 19. Coöperating with these noses are a plurality of spring-pressed plungers 23 and 24, one of which is placed on each side of the casing 6, and the plunger 23 being arranged in a higher plane than the plunger 24 for a purpose hereinafter described.

Viewing Fig. 8, it will be seen that with the operating lever 11 in a neutral position, when the sliding member 15 is lowered by pressure of the push button 17, the lower cam face of the nose 20 will engage the plunger 24 and force the selective lever 12 through the gate, so that it will be in position to operate on the shifting rod 4 on the opposite side of the casing. When this sliding member 15 is in its lowermost position, its nose 19 will be moved beneath the plunger 23 each time the operating lever is forced forward or rearward, but when the pressure has been released from the push button 17, the spring 18 will force the rod 16 upward, and with it the sliding member 15, and the forward or rearward surfaces of the nose 19, when the selective lever is moved either forwardly or rearwardly, will engage the plunger 23 and force the same inwardly until the selective lever 12 is opposite the gate 8, when the plunger 23, through its spring, will force the selective lever through the gate. When the selective lever is in engagement with the shifting rod 3, with the sliding member 15 in its lowered position, the forward and rearward faces of the nose 20 will also act upon the plunger 24, as the selective lever 12 is moved from one speed to another, and will cause said plunger 24 to be forced outwardly against the tension of the spring until the selective lever is opposite the gate, when the plunger 24 will be forced inwardly by its spring and force the selective lever 12 through said gate.

The operation of my improved shifting mechanism is as follows: Presuming that the operating lever 11 is in its normal position, with the selective lever 12 engaging the shifting rod 3, and it is desired to start the car forward, the button 17 is depressed, which causes the nose piece 20 to engage the plunger 24 and force the selective lever toward the left, or into engagement with the shifting rod 4, and any rearward movement whatever of the lever 11 will shift the rod 4 forward, and cause its arm to shift the gears in the transmission for low speed. When it is desired to move into intermediate or second speed, the button 17 will be released, and the lever 11 forced forward, and as the sliding member 15 is then in its uppermost position, the forward cam face of the nose 19 will engage the plunger 23 to shift the selective lever 12 through the gate 8, and cause it to engage the shifting rod 3. Further forward movement of the lever 11 causes the rod 3 to move rearwardly, and its arm 1 to shift the gears into intermediate position. When it is desired to operate the car at high speed, the lever 11 is simply pulled rearwardly, to the limit of its rearward movement, and this causes the shifting rod 3 to move forwardly, and its arm 1 to cause the transmission mechanism to shift gears for high speed. At this point, it might be well to mention that the lower end of the controlling lever 11 terminates in a foot-shaped member 25, whose lateral edges engage the sides of the casing to prevent the controlling lever from being moved laterally or twisted. This foot member 25 is provided with a lateral slot 26, in which the selective lever 12 has play, so that the strain on the selective lever pivot 12$^a$ is obviated.

From the foregoing it will be seen that by simply shifting the operating lever 11 forwardly and rearwardly and at the same time either depressing the button 17 or leaving the same in its normal position, the gears in the transmission casing may be shifted quickly and with little preparation as to their operation.

It is thus seen that I provide such a relation of the controlling lever and the gear selecting mechanism that in the normal neutral position of the controlling lever the parts are automatically moved into operative relation for the throwing into gear by the proper forward or backward movement of the controlling lever of either one of the two gears actuated by a given shifting rod. It is obvious that this given shifting rod may, if desired, be the rod which actuates the reverse and low or the high and intermediate gears or any other desired combination thereof. It is also obvious I provide such an interrelation of the parts when the controlling lever has been moved to throw into gear a given gear actuated by the shifting rod with which the selecting mechanism is in normally automatic engagement that by actuating the setting mechanism, provision may be made for the automatic crossing over of the selecting mechanism to the other shifting rod upon the mere movement of the controlling lever to neutral position and that the further movement of such rod either progressively in the same direction or again backward will shift such other shifting rod to make the desired change of gear, thus while running in the "intermediate" or "high" gears (assuming such to be the gears controlled by the shifting bar with which the selecting mechanism is normally in operative connection) the mechanism may be set for an automatic movement of the selector mechanism to shift the gears into low or reverse by the simple movement of the controlling lever to neutral position and then either forward or backward. For example, when the selecting lever 12 is in the position shown in Fig. 8 and the controlling or change speed 11 lever has been moved forward or backward to shift the rod 3 and throw into mesh the high or intermediate gear, the driver may depress the button 17 thereby throwing the sliding member 15 into line with the plunger 24. As the controlling lever is thus moved to normal position with the cam-block or sliding member 15 in contact with the plunger 24 the plunger 24 exerts a force tending to throw the lever 12 from right to left (Fig. 8), but movement of the lever 12 sidewise cannot be effected until the gate 8 of the rods is open for such lateral movement. Immediately upon the rod 3 having been moved to normal or neutral position the lever 12 is snapped across from the rod 3 through the gate and its operative connection with the rod 4. The controlling lever may be quickly pushed to its forward or rearward position shifting into mesh the reverse or low gear as desired. When it is then desired to change to high or intermediate gear merely throwing the control lever 11 to its neutral position throws the rod 4 to its neutral position with the gate 8 open, permitting the automatic shifting of the lever 12 to the rod 3. Continued movement of the lever 11 will instantly cause the operation of the rod 3 to throw the high or intermediate gears into mesh. Thus the selecting mechanism is entirely automatic as to the rod 3 and may be set for automatic action when change is desired from rod 3 to rod 4.

It is obvious to those skilled in the art that various modifications and rearrangements of the elements embodying my invention will readily suggest themselves and I therefore do not limit myself to the exact constructions, forms or interrelations of elements shown or described.

What I claim as new and desire to secure by Letters Patent is:

1. In a controlling mechanism of the type described, the combination, with a plurality of shifting rods to which the gear-operating members are connected, a selective lever therefor adapted to independently operate said shifting rods, a controlling lever for said selective lever, means connecting said selective lever and said controlling lever, said means permitting said selective lever to move laterally independently of said controlling lever, and means for shifting said selective lever laterally.

2. In a controlling mechanism of the type described, the combination with a plurality of shifting rods to which the gear-operating members are connected, a selective lever therefor adapted to independently operate said shifting rods, a controlling lever for said selective lever, pivoted means connecting said selective lever and said controlling lever, said means permitting said selective lever to move independently of said controlling lever, and means for shifting said selective lever laterally.

3. In a controlling mechanism of the type described, the combination with a plurality of shifting rods to which the gear-operating members are connected, a selective lever therefor adapted to independently operate said shifting rods, a controlling lever for said selective lever, means connecting said selective lever and said controlling lever, said means permitting said selective lever to move laterally independently of said controlling lever, and spring-pressed means for shifting said selective lever laterally.

4. In a controlling mechanism of the type described, the combination, with a plurality of shifting rods, to which the gear-operating members are connected, a selective lever therefor adapted to independently operate said shifting rods, a controlling lever for said selective lever, means connecting said selective lever and said controlling lever, said means permitting said selective lever to move laterally independently of said controlling lever, a guide provided in said controlling lever in which said selective lever slides, and means for shifting said selective lever laterally.

5. In a controlling mechanism of the type described, the combination, with a plurality of shifting rods to which the gear-operating members are connected, a casing in which said shifting rods slide, a selective lever adapted to independently operate said shifting rods, a controlling lever mounted in said casing for oscillating movement, means connecting said selective lever and said controlling lever, said means permitting said selective lever to shift laterally independently of said controlling lever, spring-pressed plungers mounted in the sides of said casing, and means provided upon said selective lever to engage said spring-pressed plungers for moving the selective lever laterally.

6. In a controlling mechanism of the type described, the combination, with a casing provided with a gate, a plurality of shifting rods to which the gear-operating members are connected, a selective lever therefor adapted to independently operate said shifting rods, a controlling lever for said selective lever, pivoted means connecting said selective lever and said controlling lever for permitting said selective lever to move laterally through said gate independently of said controlling lever, and means for shifting said selective lever through said gate.

7. In a controlling mechanism of the type described, the combination with a casing, a controlling lever pivotally mounted in said casing, a selective lever pivotally mounted on said controlling lever, a plurality of shifting rods, and means for shifting said selective lever laterally independently of said controlling lever for engagement with either of said shifting rods.

8. In a controlling mechanism of the type described, the combination with a plurality of shifting rods to which the gear-operating members are connected, a selective lever therefor adapted to independently operate said shifting rods, a controlling lever to which said selective lever is pivotally connected, spring-pressed plungers provided adjacent said selective lever, and means provided on said selective lever for independently engaging either of said spring-pressed plungers to cause the selective lever to engage either of said shifting rods.

9. In a controlling mechanism of the type described, the combination with a casing, a controlling lever pivotally mounted in said casing, a selective lever pivotally connected to said controlling lever for lateral movement independent of the same, a plurality of shifting rods to which the gear-operating members are connected, and which are adapted to be independently engaged by said selective lever, and means for shifting said selective lever laterally, to cause the same to engage either of said shifting rods.

10. A controlling mechanism of the type described comprising a casing, a plurality of shifting rods mounted in said casing for sliding movement, said casing having a gate, a controlling lever pivotally mounted in said casing, a selective lever swiveled to said controlling lever for independent lateral movement, projecting members provided on each side of said casing in alinement with said gate, a sliding member provided upon said selective lever, means for raising and lowering said sliding member so that the same may independently engage either of said projecting members, whereby said selective lever will be forced through said gate.

11. A controlling mechanism of the type described comprising a casing, a hollow controlling lever pivotally mounted in said casing, a plurality of shifting rods mounted in said casing for sliding movement, a selective lever pivotally mounted on said controlling lever, said means independently engaging either of said shifting rods, said casing having a gate, spring-pressed plungers provided on the sides of said casing in different planes, and in alinement with said gate, a sliding member provided on said selective lever, and means passing through said controlling lever and connected to said sliding member for causing the same to independently engage either of said plungers, whereby said selective lever will be forced through said gate.

12. A controlling mechanism of the type described, comprising a casing, a hollow lever pivotally mounted in said casing, a plurality of shifting rods also mounted in said casing for sliding movement, a selective lever pivotally mounted in said controlling lever, said means independently operating either of said shifting rods, said casing having a gate, a plurality of spring-pressed plungers mounted in the sides of said casing in different planes and in alinement with said gate, a sliding member provided upon said selective lever, a rod passing through said hollow controlling lever to the lower end of which the sliding member is connected, and a spring-pressed button provided in said controlling lever for raising and lowering said sliding member to cause the same to independently engage either of said spring-pressed plungers, whereby said selective lever is automatically forced through said gate.

13. In combination a plurality of shifting rods, a controlling lever mounted to move in a single plane from a neutral position, selective means operatively arranged to move one of said rods upon the movement of said controlling lever, said selective means being normally in operative connection with a given rod, means for actuating said selective means in a plane transverse to the plane of operation of the controlling lever and to operative connection with another of said rods, said selective means being automatically returned to its normal operative relation upon the release of said actuating means and the controlling lever reaching its neutral position.

14. In combination with a selective speed gearing, a plurality of shifting rods each operable in two directions from a neutral position and each operably connected to throw into mesh a gear upon its movement in either direction from said neutral position, a controlling lever mounted to move in a single plane in two directions from a neutral position, selective means constructed and arranged to actuate one of said rods on the movement of said controlling lever and normally in operative connection with a given shifting rod, and means for actuating said selective means in a plane transverse to the plane of operation of said controlling lever and into operative connection with another of said rods, said selective means being automatically returned to its normal operative relation upon the release of said actuating means and the controlling lever reaching its neutral position.

15. In combination, a plurality of shifting rods, a controlling lever mounted to move in a single plane in either direction from a neutral position, selective means carried by said lever and operatively arranged to move one of said rods upon the movement of said controlling lever, said selective means being normally in operative connection with a given rod, and means, operable while said selective means and given rod are in operated position, for setting said selective means for automatic actuation to operative connection with another of said rods upon the movement of the controlling lever to neutral position.

16. In combination, a plurality of shifting rods, a controlling lever mounted to move in a single plane in either direction from a neutral position, selective means carried by said lever and operatively arranged to move one of said rods upon the movement of said controlling lever, said selective means being normally in operative connection with a given rod, and means, operable while said selective means and given rod are in operated position, for setting said selective means for automatic actuation to operative connection with another of said rods upon the movement of the controlling lever to neutral position, whereby the continued movement of said controlling lever shifts said last-named rod, said selective means being automatically returned to operative connection with said given rod upon the controlling lever again being moved to neutral position.

17. In combination, a change speed gearing, a plurality of shifting rods, a controlling lever, and selective means carried by said lever for operatively connecting said lever to one of said rods, said means including setting means whereby while said controlling lever and rod are in operated position said selective means may be set for automatic and instantaneous movement into operative connection with another shifting rod upon said lever being moved to or past its neutral position and said last-named rod then shifted upon the continuous movement of said lever past or to and back away from its neutral position.

18. In combination, a change speed gearing, a plurality of shifting rods, a controlling lever, and selective means carried by said lever for operatively connecting said lever to one of said rods, said means including setting means whereby while said controlling lever and rods are in operated position said selective means may be set for automatic and instantaneous movement into operative connection with another shifting rod upon said lever being moved to or past its neutral position and said last-named rod shifted upon the continuous movement of said lever past or to and back away from its neutral position; said selective means being normally automatically returned to operative connection with said first-named rod upon the controlling lever again being moved to or past its neutral position and said first-named rod shifted upon the continuous movement of said lever past or to and back from its neutral position.

19. In combination, with a selective speed gearing, a plurality of shifting rods each operable in two directions from a neutral position and each operably connected to throw into mesh a gear upon its movement in either direction from said neutral position, a controlling lever mounted to move in a single plane in two directions from a neutral position, selective means constructed and arranged to actuate one of said rods on the movement of said controlling lever and normally in operative connection with a given shifting rod, and means operable while said selective means and given rod are in operated position, for setting said selective means for automatic and instantaneous operation in a plane transverse to the plane of operation of said controlling lever to operative connection with another of said rods upon the movement of the controlling lever to neutral position.

In testimony whereof, I have signed this specification.

PERCY F. RICE.